United States Patent
Sowig et al.

(10) Patent No.: US 6,697,128 B1
(45) Date of Patent: Feb. 24, 2004

(54) VIDEO FREQUENCY RESPONSE

(75) Inventors: Helmut Sowig, Villingen-Schwenningen (DE); Reinhard Sauter, Weilersbach (DE)

(73) Assignee: Thomson Licensing S.A., Boulogne (FR)

(*) Notice: Subject to any disclaimer, the term of this patent is extended or adjusted under 35 U.S.C. 154(b) by 402 days.

(21) Appl. No.: 09/722,764

(22) Filed: Nov. 27, 2000

(30) Foreign Application Priority Data

Nov. 29, 1999 (DE) ......................................... 199 57 365

(51) Int. Cl.$^7$ ............................................... H04N 5/50
(52) U.S. Cl. .................... 348/731; 348/733; 455/182.3; 455/192.3
(58) Field of Search ................................ 348/731–733; 455/192.1, 192.3, 192.2, 182.3, 182.2, 186.1, 185.1, 340

(56) References Cited

U.S. PATENT DOCUMENTS

| | | | | |
|---|---|---|---|---|
| 4,093,960 A | | 6/1978 | Estes .......................... 358/10 |
| 4,402,089 A | * | 8/1983 | Knight et al. ............... 455/186 |
| 4,485,404 A | * | 11/1984 | Tults ........................ 358/195.1 |
| 4,581,643 A | | 4/1986 | Carlson ..................... 358/191.1 |
| 4,748,684 A | * | 5/1988 | Wright, Jr. .................. 455/182 |
| 5,179,726 A | * | 1/1993 | Moon ........................ 455/180.4 |
| 5,353,117 A | | 10/1994 | Holman et al. ............. 348/183 |
| 5,428,405 A | | 6/1995 | Lee ............................ 348/731 |
| 5,877,822 A | | 3/1999 | Tazine et al. ............... 348/731 |
| 5,959,700 A | | 9/1999 | Arikane et al. ............. 348/731 |
| 6,188,970 B1 | * | 2/2001 | Becker et al. .............. 702/106 |
| 6,369,857 B1 | * | 4/2002 | Balaban et al. ............ 348/555 |

FOREIGN PATENT DOCUMENTS

| | | | |
|---|---|---|---|
| DE | 3134727 C2 | 4/1982 | ............ H04N/5/13 |
| DE | 4220760 A1 | 1/1993 | ............ H04N/5/50 |
| DE | 29516956 U1 | 2/1996 | ........... H04N/17/04 |
| DE | 19650313 A1 | 6/1997 | ........... H04N/17/04 |
| DE | 19602573 A1 | 8/1997 | ............. H03J/3/20 |
| EP | 0567343 | 10/1993 | |
| EP | 0314873 | 5/1998 | |
| GB | 1482241 | 8/1977 | |
| GB | 2173365 A | 10/1986 | ............. H03J/7/00 |

OTHER PUBLICATIONS

German Search Report (with translation) citing the above–listed references: AM, AN, AO, AP, AQ, and AR.

* cited by examiner

*Primary Examiner*—Victor R. Kostak
(74) *Attorney, Agent, or Firm*—Joseph S. Tripoli; Kuniyuki Akiyama

(57) ABSTRACT

For optimum videotex data coding, for error-free functioning of so-called descramblers and—not least—for the impression of improved detail resolution on the screen of a television set of displayed pictures, it is known to process the video frequency response by influencing the higher frequency components in the video signal spectrum. According to the invention, adaptation to a video frequency response sought is in each case carried out automatically by means of corresponding shifting of the vision carrier relative to the IF total transmission curve. The respective adaptation for the relevant television channel of the set is effected, in principle, by the addition of a corresponding correction value to the corresponding channel tuning voltage of the tuner.

10 Claims, 2 Drawing Sheets

VIDEO FREQUENCY RESPONSE

BACKGROUND

The invention relates to measures for processing received broadcast signals, in particular for sets for receiving and reproducing television signals.

For optimum videotex data coding, for error-free functioning of so-called descramblers and—not least—for the impression of improved detail resolution on the screen of a television set of displayed pictures, it is known to process the video frequency response by influencing the higher frequency components in the video signal spectrum. For this purpose, means which act on the video frequency response in a correspondingly selective manner are provided in the video-signal-processing section of a television set.

The channel fine tuning of the relevant set can be used effectively as another means, in particular in the case of so-called tuner tilt. This channel tuning, which in principle effects frequency detuning of the tuner and results in corresponding shifting of the vision carrier on the Nyquist slope of the transmission curve, is not familiar to everybody, however. Furthermore, such tuner tuning also does not seem appropriate since today's television sets are in any case provided with a transmitter search with automatic tuner tuning to the television channels which can be received, PLL (phase-locked loop), based tuning systems and storable channel frequency tables being provided for the tuners.

The object of the invention, therefore, is, in television sets, to simplify processing of the video frequency response by means of tuner tuning.

SUMMARY OF THE INVENTION

The invention is based on the idea, in the case of set programme location allocations that, in particular, are to be carried out by the customer for each television channel, of adaptation to a video frequency response sought in each case being carried out automatically by means of corresponding shifting of the vision carrier relative to the IF total transmission curve.

The respective adaptation for the relevant television channel of the set is effected, in principle, by the addition of a corresponding correction value to the corresponding channel tuning voltage of the tuner. In this case—for a first and for a second embodiment—the adaptation can be carried out according to the invention in a dynamic manner (i.e. by the addition of a correction value which is derived from a control or, for the second embodiment, is obtained by means of a control to the channel tuning voltage of the tuner), or—for a third embodiment—by the addition of a correction value which is determined beforehand (e.g. during the installation of the set at the customer's premises) and stored to the channel tuning voltage.

As a criterion for the video frequency response, it is advantageously possible to use, in particular for the first embodiment, the colour burst of the respective transmitted television signal, the said colour burst serving for automatic colour contrast control (Automatic Colour Control). For the first embodiment, the control voltage fed to the colour control amplifier during the colour contrast control is in this case simultaneously utilized as a correction value, in which case merely corresponding level adaptations may be necessary.

Furthermore, a measurement signal designed as a 2T pulse or a measurement signal designed as a multiburst having a correspondingly large video frequency can advantageously be utilized as a criterion for the video frequency response, in particular for the second and third embodiments. Such a measurement signal, with which the respective vision carrier is modulated, is concomitantly transmitted in any case e.g. in accordance with the CCIR Standard for television signals as a test line in these signals.

In the second embodiment, the correction value of the relevant channel is obtained by comparing the measurement signal with a reference value. According to the invention, such reference values are adapted to the respective set design. They are preferably specified e.g. during the set manufacturing process, in the course of the programming of the set $\mu P$ of the relevant television set, and stored.

In order to obtain the video frequency response sought in the relevant channel, for the third embodiment it is provided that the correction value is determined from the measurement of the measurement signal with corresponding shifting of the vision carrier relative to the IF total transmission curve—e.g. by means of the channel fine tuning of the tuner—and is subsequently stored.

The respective storage for correction and reference values is designed to be overwritable so that, if appropriate, changes can later be made, e.g. by after-sales service on the customer's premises. In this case, the same also applies correspondingly to the first embodiment with regard to a later change of level adaptations performed in the set manufacturing process.

The invention thus has the advantage that it is possible to compensate not only for the effects on the video frequency response which are caused by tolerance-dictated tuner tilts and/or tolerance-dictated deviations of the selection means in the IF range but also for those effects which are to be attributed to incorrect adaptations between television set and antenna system, or between television set, converter (such as e.g. also so-called satellite receivers) and antenna system.

Further advantages emerge from the description below. The invention is explained in more detail with reference to the drawing, in which:

DETAILED DESCRIPTION

Figure 1:
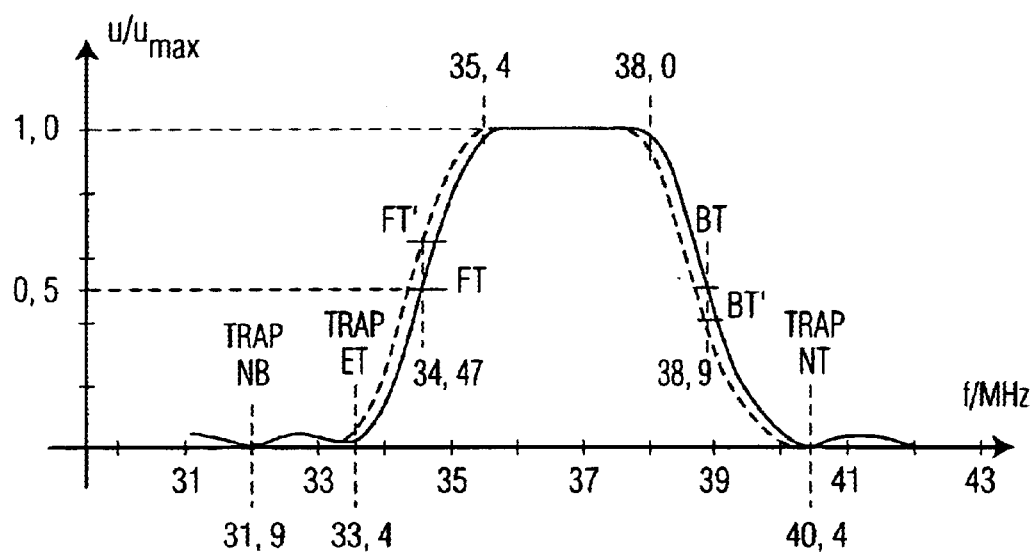
FIG. 1 shows an ideal IF total transmission curve of a television set.

FIG. 1 shows in a diagram using the amplitude profile of a normalized gain $u/u_{max}$ by way of example that region of the IF total transmission curve which is essential for a video signal, on a linear scale with the respective position of vision carrier BT and colour subcarrier FT at e.g. 38.9 MHz and 34.47 MHz, respectively, in accordance with the European television standard B according to the CCIR Standard (solid line). In this case, the vision carrier BT and the colour subcarrier FT have standard-conforming frequency spacings from the corresponding carrier frequencies of the television channels of the same standard.

Figure 2:
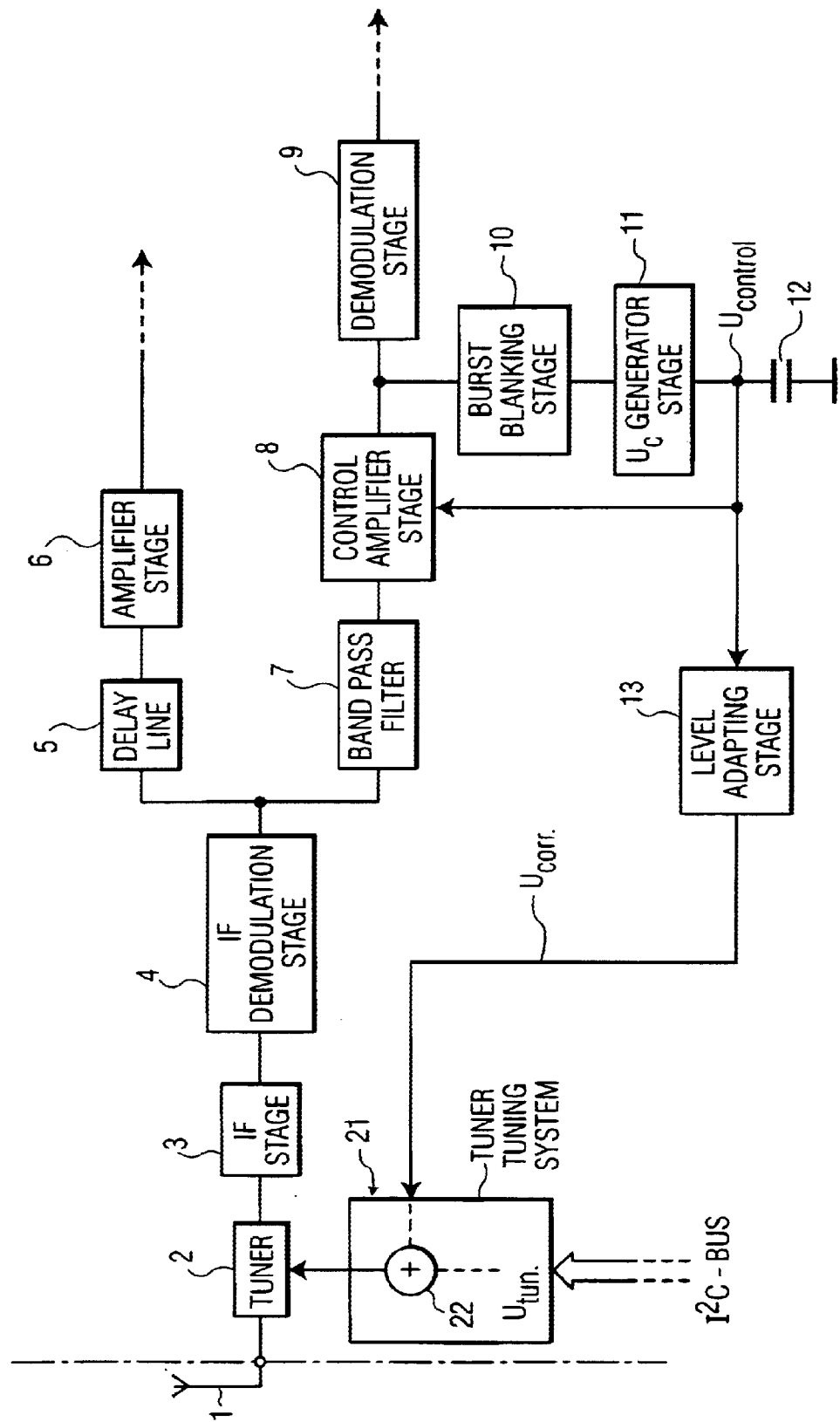
FIG. 2 shows the signal path between antenna input and signal output of the IF demodulator of a television set.

BT' and FT' designate the respective vision carrier and colour subcarrier on account of detuning—according to the invention—of a tuner 2 illustrated in FIG. 2. Such detuning is intended to effect shifting (broken line) of the vision carrier BT relative to the total transmission curve: as is illustrated by the lowering of the vision carrier level and the associated raising of the colour subcarrier level, in this case low frequency components of the video signal are lowered, while the high frequency components—which effect greater detail resolution—of the video signal are raised in a defined manner (or lowered in the case of detuning according to the invention in a different direction).

FIG. 2 shows the signal receiving region of a television set in a greatly simplifying manner using a block diagram with an illustration of the tuner 2 connected to a receiving antenna 1, of an IF stage 3 and of an IF demodulation stage 4, the IF stage 3 comprising amplifier and selection means with a surface acoustic wave filter that is customary in today's television sets.

A CVBS signal obtained by the IF demodulation stage 4 is fed to signal paths known per se for the processing of luminance and chrominance signals: a delay line 5 and downstream amplifier stages 6 form the luminance signal path in this case, and a bandpass filter 7 is provided for separating the chrominance signal or the carried chrominance signal from the CVBS signal. Arranged in the further course of the chrominance signal path is a control amplifier stage 8 for an automatic colour contrast control (ACC= Automatic Chrominance Control), which is customary particularly in PAL television sets and is followed by demodulation stages 9 for obtaining the colour difference signals B-Y and R-Y. The control amplifier stage 8 is part of a control circuit of which, with a burst blanking stage 10, a control voltage generator stage 11 and a control voltage ($U_{control}$) carrying capacitor 12, further parts which are essential for the colour contrast control are illustrated.

As is described in more detail below, the present invention makes use, for a first embodiment already mentioned, of the fact that—on account of the position of the colour subcarrier FT on a tilted slope of the IF transmission curve—even instances of slight detuning of the tuner 2 would cause visible colour contrast changes if these were not corrected by the automatic colour contrast control. However, the colour contrast is kept constant by this colour contrast control in order that the colours always—i.e. irrespective of the respective amplitude of the colour burst—have their correct colour saturation. As a result, according to the invention, the control voltage $U_{control}$ can also be used as a measure of detuning of the tuner 2 and thus, at the same time, also as a measure of the video frequency response.

According to the invention, the control voltage $U_{control}$ is fed to a level adapting stage 13 in order to obtain from the control voltage $U_{control}$ a correction voltage $U_{corr.}$, which is used as a correction value for the video frequency response and is fed to a tuner tuning system 21—e.g. of the type of the digital tuning system TUA 6010XS (TV Mixer-Oscillator-PLL) from Siemens, which system can be controlled via an I²C bus—in order to obtain the video frequency response sought together with a channel tuning voltage $U_{tun.}$ generated for the corresponding television channel in the tuner tuning system 21.

In this case, the feeding of the correction voltage $U_{corr.}$ together with the tuning voltage $U_{tun.}$, which represents the actual channel tuning voltage of the tuner, can be effected e.g. in a simple manner by means of an addition circuit 22.

The level adapting stage 13 is preferably designed as an electronically adjustable voltage divider which is programmable e.g. via control, data and address lines, designed as an I²C bus, for corresponding settings and channel assignments of the correction voltage $U_{corr.}$.

The tuning system 21 essentially contains a frequency synthesis generator according to the PLL (Phase-Locked Loop) principle with a PLL circuit for generating the desired channel frequencies with a divider, control, data and address lines designed as an I²C bus for the organization sequence during the transmitter search with storage of channel- and programme-location-related data, and electrically programmable and addressable tuning memories for the assignment of tuning information and programme location numbers.

In order to obtain the video frequency response sought in the relevant channel, it is provided, for a second and/or third embodiment (not illustrated but already mentioned) according to the invention, that, instead of the colour burst, use is made of a measurement signal designed as a 2T pulse or a measurement signal designed as a multiburst having a correspondingly large video frequency.

In the second embodiment, the correction voltage $U_{corr.}$ used as the correction value in the relevant channel is obtained by continuously comparing the measurement signal with a reference value $U_{ref.}$.

With reception of the measurement signal on an arbitrary channel, such a reference value $U_{ref.}$ can be defined as early as in the set development phase by means of a corresponding channel fine detuning. However, the channel fine detuning is preferably effected not in the customary manner known per se (i.e. by means of the tuner) but by adjustment or setting of the reference value $U_{ref.}$. The assessment of the relevant reference value $U_{ref.}$ or the setting thereof—even in the case of possible changes to the setting that are to be performed later (e.g. by after-sales service on the customer's premises, e.g. on account of a customer's specification for the picture definition impression)—can be effected in a simple manner e.g. using an oscillograph connected to a corresponding video terminal of the set. In this case, too, it is advantageously possible to use an electronically adjustable voltage divider which is programmable e.g. via control, data and address lines, designed as an I²C bus, for corresponding settings and channel assignments of the reference value $U_{ref.}$.

In the third embodiment, in order to obtain the video frequency response sought in the relevant channel, it is provided that the correction value is determined from the measurement of the measurement signal with corresponding shifting of the vision carrier relative to the IF total transmission curve by means of the channel fine tuning of the tuner and is subsequently stored.

Since the correction values to be stored correspond to corrected channel data, for the storage thereof it is provided that preferably the tuning system 21 described hereinbefore is augmented according to the invention by second electronically programmable and addressable tuning memories.

The invention has been described using a tuner with a digital tuning system. However, it shall be pointed out that the invention can also be applied in the same way to tuners with a different tuning system, such as e.g. according to the voltage synthesizer principle.

What is claimed is:

1. Method for processing received broadcast signals in a television set in order to obtain a video frequency response that is sought, comprising the steps of:

automatically adapting, for each program location of the set, the video frequency response to the video frequency response sought by means of a correction value, which effects a corresponding channel tuning by a predeterminable signal component of a television signal, which is applied to a tuner of said television set being evaluated, adding said correction value to a tuning voltage by means of an addition stage, said tuning voltage representing the actual channel tuning voltage of said tuner, and deriving said correction value from a control voltage serving for colour burst signal gain control.

2. Method according to claim 1, further comprising the step of adapting the control voltage by means of an adapting stage for the purpose of obtaining the correction value.

3. Method for processing received broadcast signals in a television set in order to obtain a video frequency response that is sought, comprising the steps of:

automatically adapting, for each program location of the set, the video frequency response to the video frequency response sought by means of a correction value, which effects a corresponding channel tuning by a predeterminable signal component of a television signal, which is applied to a tuner of said television set being evaluated, adding said correction value to a tuning voltage by means of an addition stage, automatically adapting, at said tuning program locations, the video frequency response to the video frequency response sought by means of a correction value, which effects a corresponding channel tuning, by a predeterminable signal component of a television signal which is applied to said tuner, and adding said correction value in a second addition stage to a tuning voltage representing the actual channel tuning voltage of said tuner, and said correction value being derived from a control voltage serving for color burst signal gain control.

4. Method according to claim 3, further comprising the step of using a 2T pulse or a multiburst having a corresponding video frequency as the measurement signal.

5. Method according to claim 3, further comprising the step of electrically adjusting and addressing said correction value for channel-related settings and channel assignment via control, data and address lines designed as an I C bus.

6. Method according to claim 3, further comprising the steps of determining said correction value from a measurement of a measurement signal with corresponding shifting of the vision carrier relative to the IF total transmission curve by means of channel fine tuning of said tuner, and subsequently storing said correction value.

7. Method according to claim 6, further comprising the step of storing said correction value in an electrically programmable and addressable tuning memory in the tuning system of said tuner.

8. Method according to claim 1, further comprising the steps of obtaining said correction value via a 2T pulse or a multiburst signal included in a test line of a television signal, receiving said correction value by an antenna system and feeding said correction value into the tuner.

9. Television set comprising a tuner, an IF demodulation stage, program locations, for which each the video frequency response is automatically adapted to the video frequency response sought by means of a correction value, which effects a corresponding channel tuning, by a predeterminable signal component of a television signal which is applied to said tuner, and an addition stage, for adding said correction value to a tuning voltage representing the actual channel tuning voltage of said tuner, and said correction value being derived from a control voltage serving for colour burst signal gain control.

10. Television set according to claim 9, characterized in that said tuner has additional tuning memories, which are provided for storing channel-related video frequency response correction values.

* * * * *

UNITED STATES PATENT AND TRADEMARK OFFICE
CERTIFICATE OF CORRECTION

PATENT NO.     : 6,697,128 B1
DATED          : February 24, 2004
INVENTOR(S)    : Sauter Reinhard and Sowig Helmut It is certified that error appears in the above-identified patent and that said Letters Patent is hereby corrected as shown below:

<u>Title page, Item [54] and Column 1, line 1,</u>
Title, should be -- METHOD AND APPARATUS FOR PROCESSING BROADCAST SIGNALS. --

Signed and Sealed this

Eleventh Day of January, 2005

JON W. DUDAS
*Director of the United States Patent and Trademark Office*